United States Patent [19]
Harrington, Jr.

[11] 3,927,818
[45] Dec. 23, 1975

[54] METHOD OF INSTALLING CYLINDRICAL BELLOWS

[75] Inventor: Edward F. Harrington, Jr., Louisville, Ky.

[73] Assignee: Chemetron Corporation, Chicago, Ill.

[22] Filed: Aug. 21, 1974

[21] Appl. No.: 499,342

Related U.S. Application Data

[63] Continuation of Ser. No. 315,047, Dec. 14, 1972, abandoned.

[52] U.S. Cl. .................. 228/189; 228/184; 228/178
[51] Int. Cl.² ........................................ B23K 31/02
[58] Field of Search.......... 29/401 R, 423, 425, 426, 29/454, 455, 457, 471.1, 471.3, 481, 482, 157 T, 157.3 C, 157.4, 491

[56] References Cited
UNITED STATES PATENTS

| | | | |
|---|---|---|---|
| 1,840,305 | 1/1932 | Andrus | 29/471.1 X |
| 2,489,802 | 11/1949 | Needham | 29/471.1 |
| 3,299,417 | 1/1967 | Sibthorpe | 29/455 X |
| 3,365,566 | 1/1968 | Kuder | 29/491 X |

Primary Examiner—James L. Jones, Jr.
Assistant Examiner—Margaret Joyce
Attorney, Agent, or Firm—N. M. Esser

[57] ABSTRACT

A cylindrical bellows is installed around a pipeline or other structure by a method comprising the steps of sectioning the bellows into a plurality of cylindrical sections, positioning the sections around the pipeline or other structure, welding the sections together to reform the bellows around the pipeline or other structure, and mounting the bellows at opposite ends to suitable supports.

3 Claims, 5 Drawing Figures

METHOD OF INSTALLING CYLINDRICAL BELLOWS

This is a continuation of application Ser. No. 315,047, filed Dec. 14, 1972, now abandoned.

BACKGROUND OF THE INVENTION

This invention pertains to cylindrical bellows commonly employed as expansion joints in various applications in which such bellows can be installed around a pipeline or other structure. Such bellows, which usually are circular in cross-section, can be employed not only to permit relative movement of the structures to which opposite ends of the bellows are mounted but also to contain various fluids. Such bellows having multiple plies, as are conventional in many applications, additionally can be employed not only to provide multiple fluid containing barriers but also to facilitate leak detection through known techniques whereby the space between two plies can be maintained at controlled pressure and monitored to detect pressure change indicative of a leak in either ply. Several examples of such bellows having multiple plies and known techniques for leak detection are described in U.S. Pat. Nos. 3,183,022, 3,299,417, 3,472,062, and 3,655,224.

Heretofore, once installed as expansion joints in critical applications such as nuclear reactor penetration assemblies, a bellows frequently could not be replaced, as in the event of a leak or other failure, except under very exacting and costly procedures. In a typical nuclear reactor penetration assembly, as an example, such techniques require the handling of radioactively contaminated material in the pipeline about which the bellows had been installed and involve removing the bellows, making multiple cuts in the pipeline about which the bellows had been installed, removing virtually the entire assembly including a portion of such pipeline, reinstalling the assembly, and testing the assembly as by X-ray testing of all welds in such pipeline. It has been estimated that, at material and labor costs prevailing in the United States as of 1972, total costs to replace a bellows thereunder in a typical nuclear reactor penetration assembly exceed $200,000.00. Therefore, there is a clearly demonstrated need for a new and improved method of installing a cylindrical bellows around a pipeline or other structure.

SUMMARY OF THE INVENTION

Accordingly, one object of this invention is to provide a new and improved method of installing a cylindrical bellows around a pipeline or other structure. Similarly, another object of this invention is to provide such a method whereby the pipeline or other structure need not be removed to permit the bellows to be installed.

Broadly, these objects may be attained in a method of installing a cylindrical bellows around a pipeline or other structure comprising the steps of sectioning the bellows into longitudinal sections, positioning the sections around the pipeline or other structure, and welding the sections together to reform the bellows around the pipeline or other structure. Also, this invention contemplates that the bellows can have one or more plies and that the structure around which the bellows is to be installed can comprise another bellows.

Furthermore, another object of this invention is to provide a new and improved method of mounting a cylindrical bellows having multiple plies to a tubular support, preferably to a radially outer surface of such support. Such method complements the new and improved method, as described above, of installing a cylindrical bellows around a pipeline or other structure.

These and other objects, features, and advantages of this invention will be evident from the following detailed description, with the aid of accompanying drawings, of a presently preferred mode of carrying out this invention.

DETAILED DESCRIPTION OF PREFERRED MODE

Figure 1:
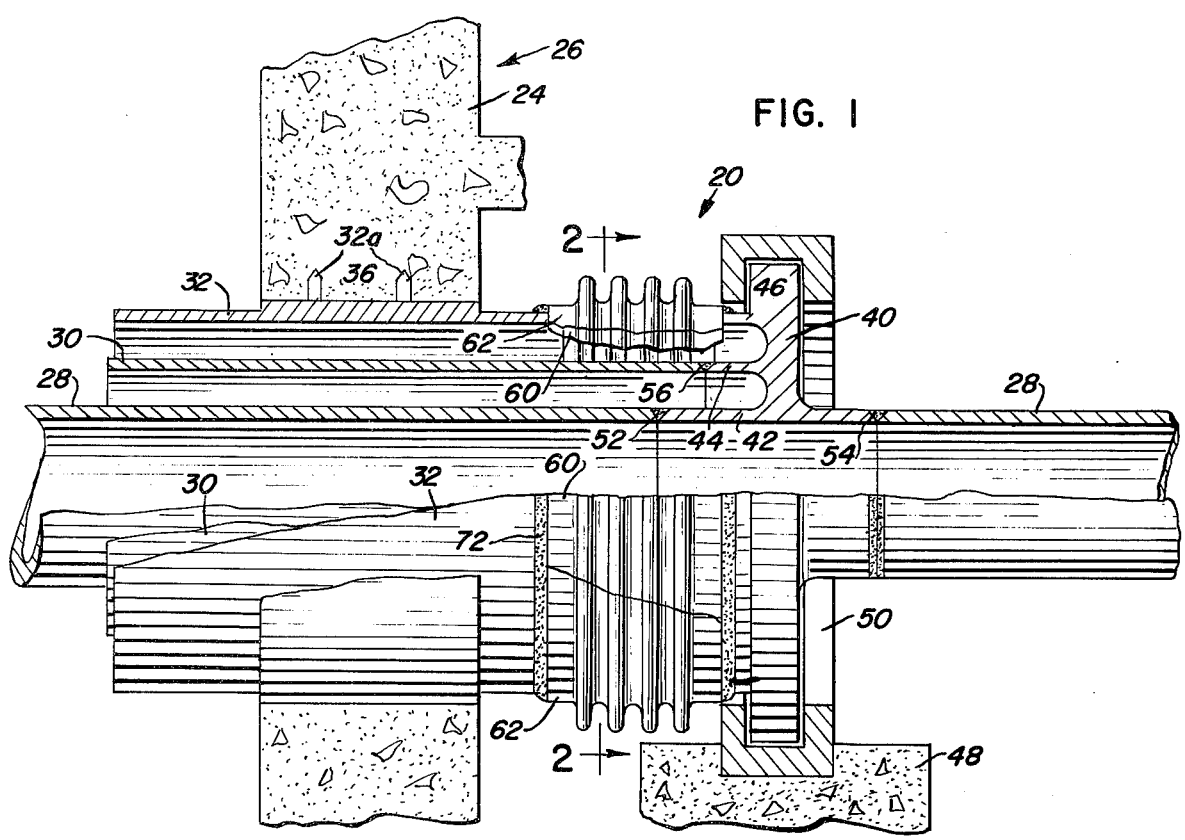
FIG. 1 is a longitudinal elevational view, partially sectioned, of a cylindrical bellows embodied in a nuclear reactor penetration assembly.

FIG. 1 illustrates a bellows 20 embodied in a nuclear reactor penetration assembly 22. The assembly 22 penetrates a wall 24 of a concrete containment vessel 26 of a type commonly used to contain any radioactively contaminated effluents from a nuclear reactor (not shown) to the left of the wall 24 in FIG. 1.

The assembly 22 generally comprises a pipeline 28, which delivers a fluid such as water or steam to or from the reactor, a tubular guard pipe 30, which is interposed between the pipeline 28 and the bellows 20 to protect the bellows 20 from damaging impingement by escaping fluid in the event of a leak in the pipeline 28, and a nozzle 32, which is disposed around the tubular guard pipe 30. The nozzle 32 is anchored, as by radial members 32a, within an opening 36 in the wall 24.

A flanged welding head 40 (commonly known as a "flued head"), which has a tubular base portion 42 and concentric inner and outer tubular flanges 44 and 46 respectively, may be anchored to a concrete base 48 by a removable anchoring ring 50. The tubular base portion 42 forms a portion of the pipeline 28 and is welded to connecting portions of the pipeline 28 by circumferential weldments 52 and 54. The pipe 30 is welded at one end to the flange 44 by circumferential weldment 56. The bellows 20 is installed around the pipe 30 and the pipeline 28, in the manner next to be described, with opposite ends respectively of the bellows 20 welded to the nozzle 32 and the flange 46 respectively.

Figure 2:
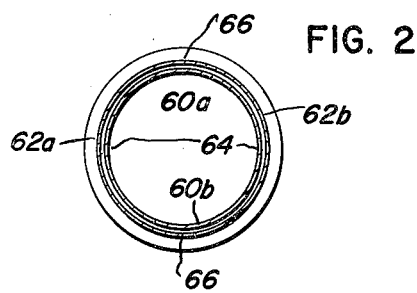
FIG. 2 is a reduced cross-section, taken substantially along line 2—2 of FIG. 1, through the bellows only of FIG. 1, certain dimensions being exaggerated for greater clarity.

The bellows 20 has concentric inner and outer plies 60 and 62 respectively in radial registry with each other along a series of circumferential convolutions. For the purposes of this invention, each ply of the bellows 20 is sectioned, as by cutting along longitudinal lines, into cylindrical sections, preferably cylindrical halves as shown in FIG. 2, to permit the bellows 20 to be installed around the pipe 30. In FIG. 2, in which the thickness and radial spacing of the plies 60 and 62 have been exaggerated for greater clarity, cylindrical halves of the inner ply 60 are indicated at 60a and 60b respectively, and cylindrical halves of the outer ply 62 are indicated at 62a and 62b respectively.

Preferably, the bellows 20 is formed with radial spacing between the plies 60 and 62 in the manner disclosed in copending application Ser. No. 315,259, filed Dec. 14, 1972, now U.S. Pat. No. 3,800,398, and assigned to the assignee of this application. As disclosed in said application, an intermediate ply is removed, after the inner, intermediate, and outer plies of a bellows have been sectioned into cylindrical sections, to provide, between the inner and outer plies to be reformed as intact plies from appropriate sections welded together, radial spacing approximately equal to the thickness of the intermediate ply.

The cylindrical halves 60a and 60b (or other cylindrical sections) of the inner ply 60 are positioned around the pipe 30, and thus around pipeline 28, and, thus positioned, are welded together along longitudinal seams 64 to reform the inner ply 60 as an intact ply. As may be desired, welding back-up tape (not shown) of known type (c.f. U.S. Pat. No. 2,916,001) may be applied to support each weldment 64 at the radially inner sides of the cylindrical halves 60a and 60b (or other cylindrical sections) to be welded together.

Figure 4:
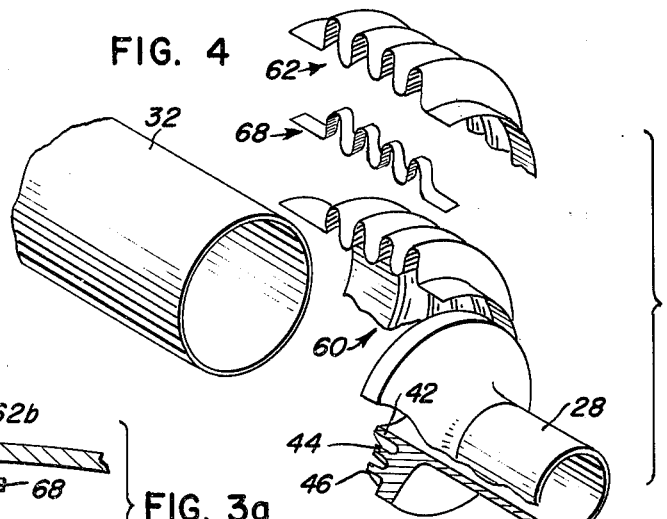
FIG. 4 is an exploded isometric view, partially fragmentary, of certain portions of the assembly of FIG. 1.
Figure 3A:
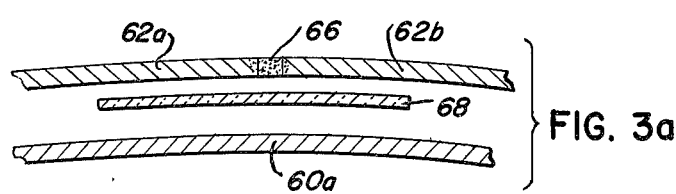
FIGS. 3a and 3b are greatly enlarged fragmentary details of alternative arrangements for a portion of the bellows shown in FIG. 2.
Figure 3B:
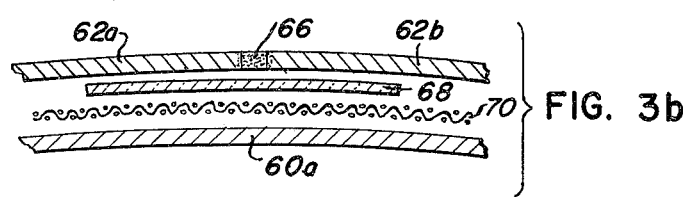

After the cylindrical halves 60a and 60b (or other cylindrical sections) of the inner ply 60 have been welded together to reform the inner ply 60 as an intact ply, the cylindrical halves 62a and 62b (or other cylindrical sections) of the outer ply 62 are positioned around the inner ply 60, such that the convolutions of the inner and outer plies 60 and 62 respectively again are in radial registry, and, thus positioned, are welded together along longitudinal seams 66 to reform the outer ply 62 as an intact ply. Preferably, welding back-up tape 68 (FIGS. 3a and 4) of known type as mentioned above is applied to support the weldments 66 at the radially inner sides of the cylindrical halves 62a and 62b (or other cylindrical sections) to be welded together. As may be desired, a strip 70 (FIG. 3b) of fluid-pervious wire meshwork may be interposed between the tape 68 and the inner ply to assure fluid flow across the seam 66 between the plies 60 and 62. Preferably, the seams 64 and 68 are spaced angularly, approximately 90° as shown in FIG. 2, to avoid any interference between the seams 64 and 68.

The bellows 20 comprises opposite tubular end portions commonly called "tangent ends" in the art. These ends are welded to the nozzle 32 and the flange 46 respectively, by circumferential weldments 72 and 74, as in the manner disclosed in copending application Ser. No. 315,946, filed Dec. 14, 1972, now U.S. Pat. No. 3,833,245, and assigned to the assignee of this application.

I claim:

1. A method of installing around a pipeline a cylindrical bellows having spaced inner and outer plies in radial registry with each other along a series of circumferential convolutions comprising the steps of sectioning each ply into longitudinal sections, positioning the sections of said inner ply around said pipeline, welding the sections of said inner ply together, applying a welding back-up tape to the radially inner side of an outer ply section along each longitudinal edge, positioning the sections of said outer ply around said inner ply such that said outer ply sections are spaced from and are in radial registry along the series of circumferential convolutions with said inner ply, and welding the sections of said outer ply outward of said tape together.

2. A method of installing around a pipeline extending between opposite tubular supporting elements a cylindrical bellows having spaced inner and outer plies in radial registry with each other along a series of circumferential convolutions and having opposite tubular end portions comprising the steps of sectioning each ply into longitudinal semi-cylindrical sections, positioning the sections of said inner ply around said pipeline, welding the sections of said inner ply together, applying a welding back-up tape to the radially inner side of an outer ply section along each longitudinal edge, positioning said outer ply section around said inner ply such that said outer ply section is spaced from and is radial registry along the series of circumferential convolutions of said inner ply, inserting a fluidpervious meshwork strip between each tape and said inner ply, positioning the other outer ply section around said inner ply, welding the sections of said outer ply outward of said tape together and welding the respective end portions to the respective supporting elements.

3. The method of claim 2 in which a ceramic welding back-up tape is applied.

* * * * *